I. FOX.
FRAME FOR EYEGLASSES AND SPECTACLES.
APPLICATION FILED AUG. 16, 1911.

1,062,777.

Patented May 27, 1913.

WITNESSES
Daniel Webster Jr.
William Conway.

INVENTOR
Ivan Fox
BY Cyrus N. Anderson
ATTORNEY

UNITED STATES PATENT OFFICE.

IVAN FOX, OF MEDIA, PENNSYLVANIA

FRAME FOR EYEGLASSES AND SPECTACLES.

1,062,777.  Specification of Letters Patent.  Patented May 27, 1913.

Application filed August 16, 1911. Serial No. 644,377.

*To all whom it may concern:*

Be it known that I, IVAN FOX, a citizen of the United States, residing in Media, Delaware county, Pennsylvania, have invented a certain new and useful Improvement in Frames for Eyeglasses and Spectacles, of which the following is a specification.

My invention relates to improvements in the construction of frames for eye glasses or spectacles constructed of shell or material having characteristics similar thereto.

The object of my invention is to provide a construction including means which will prevent the loosening and pivotal movement of the rims of the eyeglasses with respect to other parts of the frame structure, such, for instance, as the bridge.

Convenient forms of embodiment of my invention are illustrated in the accompanying drawings to which reference may be made in connection with the description thereof, which follows, for the purpose of more readily and clearly understanding the same.

Figure 1:
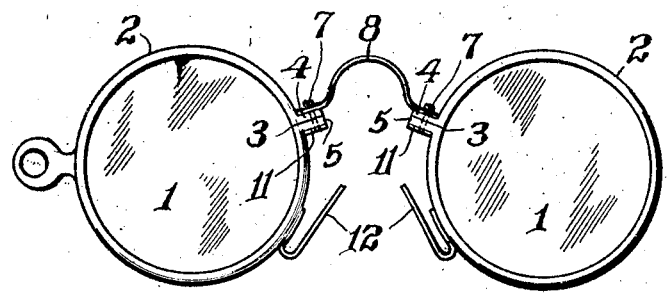
Figure 2:
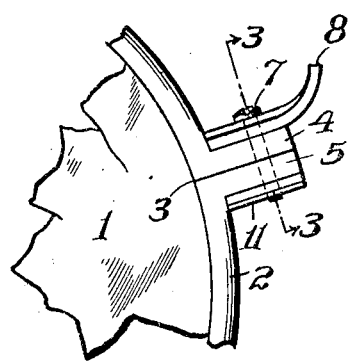
Figure 3:
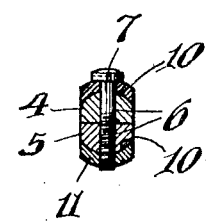
Figure 4:
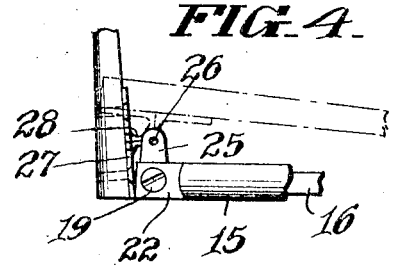
Figure 5:
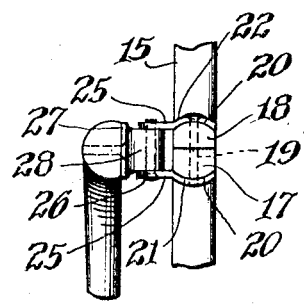

In the drawings,—Figure 1 is a front view of a pair of eye glasses having rims of shell or other similar non-metallic material; Fig. 2 is an enlarged front view of part of a lens and the rim showing the rim disconnected or non-continuous and the manner of connecting the same together, the connecting means also securing the adjacent or abutting ends of the said rims to one end of the bridge which connects the lenses and rims together; Fig. 3 is a transverse section on the line 3—3 of Fig. 2; Fig. 4 is a top plan view of one end portion of a lens and rim of a pair of eye glasses, the said rim consisting of shell or other similar non-metallic material and showing the temple piece connected thereto; and Fig. 5 is an end view of a pair of spectacles provided with my invention and showing the temple piece in folded position parallel or substantially so to the plane of the lenses of the spectacles.

Having reference to Figs. 1 to 3 of the drawings, 1 designates the lenses of a pair of eye glasses provided with rims 2 of shell or other similar non-metallic material. The rims do not extend continuously and integrally entirely around the lenses but are non-continuous, being interrupted at the point 3. The adjacent or abutting ends at 3 are provided with outwardly extending lugs or projections 4 and 5 having holes or perforations 6 extending therethrough through which screws are extended for the purpose of securing the said ends together to clamp and hold the lenses within the rims and also for the purpose of connecting the opposite ends of the bridge 8 to the said rims.

The upper side of each of the projections 4 and the lower side of each of the projections 5 are convex as shown at 10 and the opposite ends of the bridge are also concavo-convex in transverse section the convex surfaces 10 upon the upper sides of the projections 4 nesting in the concaved seats at the opposite ends of the said bridge. The screw threaded ends of the screws 7 engage nuts 11 situated upon the under side of the projections or lugs 5. The said nuts are curved as shown in Fig. 3 of the drawings and the concaved curved surface thereof fits snugly about the curved surface 10 of the said projections 5. The screws 7 clamp the parts 4, 5, 11 and the opposite ends of the bridge firmly together and by reason of the fact that the opposite ends of the said bridge are curved and fit over the curved surfaces 10 upon the projections 4 pivotal movement of the latter and of the rims of which they form parts about the said screws 7 as pivots is prevented.

The nose rests 12 may be of any suitable known construction and are secured to the rims of the frame at points below the projections 4 and 5.

In Figs. 4 and 5 I have shown a construction in which the principle of my invention is applied to spectacles having frames in which the rims are constructed of shell or other non-metallic material having similar characteristics and qualities. In the said figures, 15 designates a portion of a rim and 16 a portion of a lens held within the said rim. As in the previously described construction the rim is not continuous but is interrupted at points at the outer edges of the lenses as is illustrated in Fig. 5 of the drawing. The adjacent abutting ends of the said rim are provided with projections 17 and 18 which are adapted to be connected together by means of screw 19. The outer surface of the projections 17 and 18 are curvilinear in outline as indicated at 20 and such curvilinear surfaces fit snugly within the concaved surfaces of the washers 21 and 22. The head of the screw 18 fits against the washer 22 and the other washer 21 has screw threaded engagement with the said screw which operates to clamp the parts 17, 18, 21, and 22 firmly together and thereby secure the lens within the rim 15. Ears or projections 25 project rearwardly from the nuts 21 and 22 and support a pivot 26. The ends of the temple pieces which are of shell or other suitable non-metallic material are provided with plates 27 each having a projection 28 thereon which is pivoted upon a pivot 26. By reason of the fact that the nuts 21 and 22 are curved as indicated and fit the curved surfaces of the projections 17 and 18 said nuts are held against turning or pivotal movement by the single screw 19.

Having thus described my invention, I claim:—

1. A pair of eye glasses including rims for holding the lenses, the integrality of the said rims being interrupted at certain points and the said rims being provided with projections at such points the surface of the upper side of the uppermost projection and the surface of the lower side of the lowermost projection being convexed, means having concaved surfaces for engaging the said convexed surfaces, means for securing the said first-named means to the said projections and for securing the said projections together, and parts of the frame structure of the eye glasses connected to the said securing means.

2. In eyeglasses, rims of non-metallic material, the integrality of which is interrupted at certain points and the said rims being provided with projections at such points and the opposite sides of said projections being curved, a bridge having transversely curved ends, which fit the said curved sides upon the said projections, and means for securing the ends of said bridge and the said projections together.

3. In eyeglasses, the combination of rims of non-metallic material, the continuity of the said rims being interrupted and the said rims having projections secured thereto upon opposite sides of the point where the continuity is broken, the outer edges of the said projections being curvilinear, with a bridge for connecting the rims and lenses together, the opposite end portions of the said bridge being curvilinear in transverse section whereby concaved seats are formed which fit upon the convex surfaces of the upper sides of the said projections, and means for securing and clamping the ends of said bridge to said projections.

4. In eyeglasses, the combination of the lenses and the rims surrounding and holding the said lenses, the continuity of which rims is interrupted and the said rims being provided with projections upon opposite sides of the abutting ends at the point of interruption and the outer edges or sides of said projections being convex in outline, with a bridge having its opposite ends concavo-convex in transverse section and the concaved sides of the said ends resting upon the upper convexed sides or edges of the said projections, nuts concavo-convex in transverse section having their concaved sides or surfaces seated against the convex surface of the lower edges or sides of the said projections, and means for clamping and connecting the opposite ends of the said bridge, the said projections, and the said nuts together.

In testimony that I claim the foregoing as my invention, I have hereunto signed my name this 15th day of August, A. D. 1911.

IVAN FOX.

In the presence of—
GEO. H. WEIDNER,
CARRIE E. KLEINFELDER.